United States Patent [19]

Osanai

[11] Patent Number: 4,701,853

[45] Date of Patent: Oct. 20, 1987

[54] CONTROL DEVICE IN CONTINUOUSLY VARIABLE TRANSMISSION SYSTEM FOR VEHICLE

[75] Inventor: Akinori Osanai, Susono, Japan

[73] Assignee: Toyota Jidosha Kabushiki Kaisha, Toyota, Japan

[21] Appl. No.: 739,615

[22] Filed: May 31, 1985

[30] Foreign Application Priority Data

Jun. 6, 1984 [JP] Japan ................................ 59-114508

[51] Int. Cl.$^4$ ...................... G05D 17/02; B60K 41/14
[52] U.S. Cl. .................... 364/424.1; 74/866; 474/11; 474/28
[58] Field of Search ....................... 364/424.1; 74/866; 474/11, 12, 16, 18, 28

[56] References Cited

U.S. PATENT DOCUMENTS

| | | | |
|---|---|---|---|
| 4,507,986 | 4/1985 | Okamura et al. | 74/866 |
| 4,543,077 | 9/1985 | Yamamuro et al. | 474/12 |
| 4,546,673 | 10/1985 | Shigematsu et al. | 74/866 |
| 4,561,327 | 12/1985 | Niwa et al. | 74/866 |
| 4,569,254 | 2/1986 | Itoh et al. | 74/866 |
| 4,584,907 | 4/1986 | Niwa et al. | 74/866 |
| 4,590,561 | 5/1986 | Abo et al. | 364/424.1 |

Primary Examiner—Felix D. Gruber
Attorney, Agent, or Firm—Oblon, Fisher, Spivak, McClelland, & Maier

[57] ABSTRACT

In a control device in a continuously variable transmission system for a vehicle, wherein the continuously variable transmission system is provided on a power transmission route of an engine and a speed ratio thereof is controlled such that an engine rotational speed can be a target engine rotational speed, when a detected acceleration during acceleration is smaller in value than the reference acceleration or a detected deceleration during deceleration is smaller in value than the reference deceleration, the transient time target engine rotational speed is selected instead of the steady time target engine rotational speed, whereby a speed ratio of the continuously variable transmission system is made to be a small value during acceleration and deceleration.

14 Claims, 9 Drawing Figures

CONTROL DEVICE IN CONTINUOUSLY VARIABLE TRANSMISSION SYSTEM FOR VEHICLE

BACKGROUND OF THE INVENTION

1. Field of the Invention

This invention relates to a control device in a continuously variable transmission system (hereinafter referred to briefly as "CVT") used as a power transmission system in a vehicle, and more particularly to control during transient time of the vehicle.

2. Description of the Prior Art

The CVT is provided on a power transmission route of an engine and a speed ratio e (=Nout/Nin, where Nout and Nin are rotational speeds on the output and input sides of the CVT) thereof is controlled such that an engine rotational speed can be a target engine rotational speed. For example, in Japanese patent application No. 67362/1982 filed by the present applicant, the target engine rotational speed is set at an engine rotational speed for achieving a required output of the engine, which is commensurate to an intake throttle opening during the steady time at the minimum fuel consumption rate regardless of the steady time or the transient time of the vehicle. In consequence, a satisfactory driveability is not obtained during acceleration and deceleration and, during running where accelerations and decelerations are alternatley repeated, the target engine rotational speed is considerably varied, whereby a time period required for the shifting of the CVT is lengthened, and an efficiency of the power transmission, namely the fuel consumption rate is deteriorated.

To obviate this, it is conceivable that in addition to D (Drive) range, a 2nd range where a target engine rotational speed during acceleration and deceleration is set separately the case of D range, and a driver manually shifts to the 2nd range during acceleration and deceleration. However, this presents such a disadvantage as to make the operation complicated.

Japanese Patent Laid-Open No. 180864/1983 teaches that an acceleration of the vehicle is detected, and, when the acceleration is small in value, a transmission ratio (a transmission ratio is an inverse number of a speed ratio e) of the CVT is increased. However, the transmission ratio during deceleration can not be distinguished from the steady time in particular, whereby, during running where accelerations and decelerations are frequently repeated, a satisfactorily good driveability has not heretofore been obtained.

SUMMARY OF THE INVENTION

The present invention has as its object the provision of a control device in a CVT for a vehicle, wherein, necessity for a driver to operate a shift range is eliminated, during both the acceleration and the deceleration, an outstanding driveability can be obtained, and, even during running where accelerations and decelerations are alternately repeated, a good driveability is obtained.

To this end, the present invention contemplates that, in a control device in a CVT for a vehicle, wherein the CVT is provided on a power transmission route of an engine and a speed ratio thereof is controlled such that an engine rotational speed can be a target engine rotational speed, the control device includes:

an acceleration requirement detecting means for detecting a requirement for an acceleration of the vehicle;

a deceleration requirement detecting means for detecting a requirement for a deceleration of the vehicle;

an acceleration detecting means for detecting an acceleration of the vehicle;

a deceleration detecting means for detecting a deceleration of the vehicle;

a first comparing means for comparing a detected acceleration with a reference acceleration;

a second comparing means for comparing a detected deceleration with a reference deceleration;

a selecting means for selecting a steady time target engine rotational speed or a transient time target engine rotational speed as a target engine rotational speed; and a control means for selecting a transient time target engine rotational speed when a detected acceleration during acceleration is smaller in value than the reference acceleration or a detected deceleration during deceleration is smaller in value than the referencae deceleration.

Even though there are required an acceleration or a deceleration, if the actual acceleration or deceleration is small in value and a desired acceleration or deceleration is not generated, then a transient time target engine rotational speed is selected to control a speed ratio of the CVT, whereby, during acceleration or deceleration the speed ratio e of the CVT comes to be a small value, so that a driving torque during acceleration or an engine brake during deceleration can be increased, thereby enabling to obtain a satisfactory acceleration or deceleration.

According to the present invention, not only during acceleration but also during deceleration, the transient time target engine rotational speed is selected, so that a satisfactory driveablility can be obtained even during running where accelerations and decelerations are alternately repeated.

The acceleration requirement detecting means preferably judges that, when a condition where an intake throttle opening $\theta$ is larger than a predetermined value $\theta 1$ lasts longer than a predetermined time Ta1, an acceleration of the vehicle is required. Even though the driver does not require an acceleration in particular, he may instantaneously depress an accelerator pedal, so that the true intent of the driver can be ascertained by setting the predetermined time Ta1.

The deceleration requirement detecting means preferably judge that, when the intake throttle opening $\theta$ is at an idling opening, a deceleration of the vehicle is requred.

When the transient time target engine rotational speed is selected, the control means holds the transient time target engine rotational speed during a predetermined time Tb after $\theta$ is changed from a state of $\theta$ larger than $\theta 1$ to a state $\theta$ smaller than or equal to $\theta 1$, or a detected acceleration or a detected deceleration reaches a reference acceleration or a reference deceleration. When driving over a long uphill road or a downhill road, or when the uphill roads and the downhill roads repeatedly appear, an acceleration requirement and a deceleration requirement may occur again, or the acceleration requirements and deceleration requirements may alternately occur. Even after a condition of the transient time disappears, the control relating to the transient time target engine rotational speed is not immediately interrupted, whereby, in that case, the transient time target engine rotational speed is continuously used, so that the driveability can be improved.

Preferably, the transient time target engine rotational speed is set as a function of the intake throttle opening $\theta$ and a vehicle speed V, the reference acceleration is set as a function of the intake throttle opening $\theta$ and the vehicle speed V and the reference deceleration is set as a function of the vehicle speed V.

Further preferably, as the aforesaid steady time target engine rotational speed, an engine rotational speed is set, at which a required value of an engine output commensurate to the intake throttle opening $\theta$ can be obtained at the minimum fuel consumption rate, and as the aforesaid transient time target engine rotational speed, an engine rotational speed is set, at which the most proper driving torque and engine brake occur under various conditions.

Still further preferably, a steady time table and a transient time table, which are commensurate to the steady time target engine rotational speed and the transient time target engine rotational speed, respectively, are set, and the selecting means is caused to select either one of the tables, or the steady time target engine rotational speed is to be made a basic target engine rotational speed, with the selecting means selecting a coefficient thereof.

BRIEF DESCRIPTION OF THE DRAWINGS

The exact nature of this invention, as well as other objects and advantages thereof, will be readily apparent from consideration of the following specification relating to the accompanying drawings, in which like reference characters designate the same or similar parts throughout the figures thereof and wherein.

DETAILED DESCRIPTION OF THE INVENTION

Description will hereunder be given of embodiments of the present invention with reference to the drawings.

Figure 1:
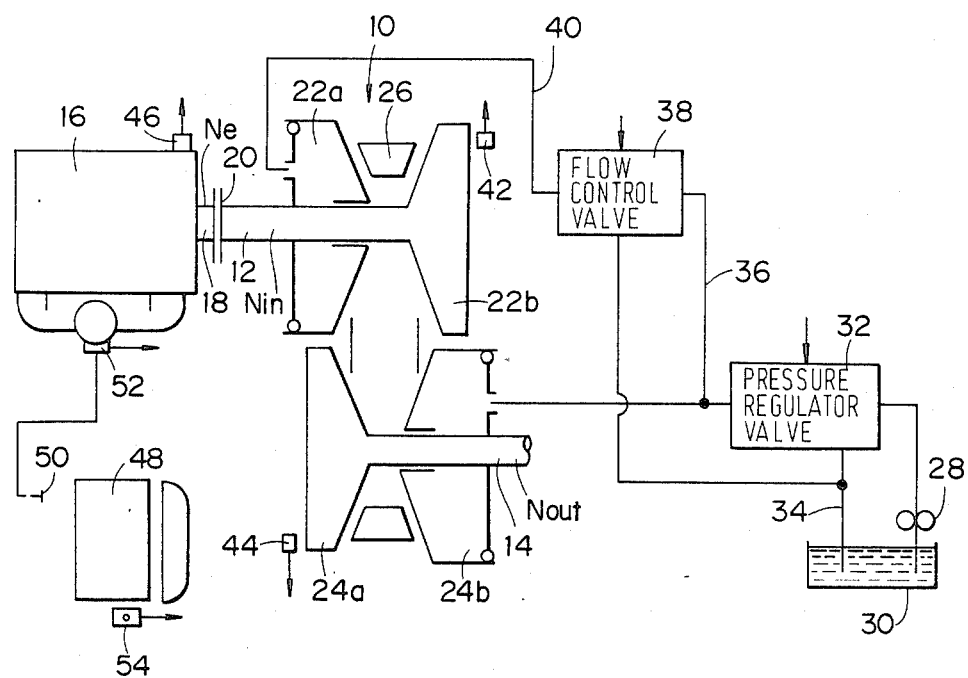
FIG. 1 is a schematic diagram showing the CVT as a whole.

Referring to FIG. 1, a CVT 10 has an input shaft 12 and an output shaft 14 being in parallel to each other. The input shaft 12 is provided coaxially with a crankshaft 18 of an engine 16, and connected to the crankshaft 18 through a clutch 20. Pulleys 22a and 22b on the input side are opposed to each other, and one 22a of the pulleys on the input side as being a movable pulley is provided on the input shaft 12 in a manner to be movable in the axial direction, and fixed in the rotating direction, while, the other 22b of the pulleys on the input side as being a stationary pulley is fixed to the input shaft 12. Similarly, pulleys 24a and 24b on the output side are opposed to each other, one 24a of the pulleys on the output side as being a stationary pulley is fixed to the output shaft 14, while, the other 24b of the pulleys on the output side as being a movable pulley is provided on the output shaft 14 in a manner to be movable in the axial direction and fixed in the rotating direction. Opposed faces of the pulleys 22a and 22b on the input side and those of the pulleys 24a and 24b on the output side are formed into tapered shapes, respectively, and a belt 26 having an isosceles trapezoidal shape in cross section is racked across the pulleys 22a and 22b on the input side and the pulleys 24a and 24b on the output side. An oil pump 28 feeds oil to a pressure regulator valve 32 from an oil pool 30. The pressure regulator valve 32 comprises an electromagnetic relief valve and varies a spill volume of oil to a drain 34 to control a line pressure of an oil line 36, whereby the line pressure of an oil line 36 is delivered to a hydraulic cylinder of the pulley 24b on the output side and a flow control valve 38. The flow control valve 38 controls the feed flowrate of oil from the oil line 36 to an oil line 40 connected to a hydraulic cylinder of the pulley 22a on the inout side and the discharge flowrate of oil from the oil line 40 to the drain 34. Forces urging against the belt 26 of the pulleys 22a and 22b on the input side and of the pulleys 24a and 24b on the output side are controlled by the hydraulic pressures of the hydraulic cylinders on the input side and the output side, and the diameters of the belt 26 guided around the tapered surfaces of the pulleys 22a and 22b on the input side and of the pulleys 24a and 24b on the output side, which are varied in association with the aforesaid urging forces, with the result that the speed ratio e (=Nout/Nin, where Nout is a rotational speed of the output shaft 14, Nin is a rotational speed of the input shaft 12, and, in this embodiment, Nin = engine rotational speed Ne) of the CVT 10 is varied. The line pressure of the hydraulic cylinder on the output side is controlled to the least necessary value which can secure the power transmission, avoiding slips of the belt 26, in order to prevent the driving loss of the oil pump 28, and the speed ratio e is controlled by the hydraulic pressure of the hydraulic cylinder on the input side. Additionally, the hydraulic pressure of the hydraulic cylinder on the input side is lower than or equal to the hydraulic pressure of the hydraulic cylinder on the output side, however, the pressure receiving area of the hydraulic cylinder on the input side is larger than the pressure receiving area of the hydraulic cylinder on the output side, so that the urging force of the pulleys 22a and 22b on the input side can be made larger than the urging force of the pulleys 24a and 24b on the output side. A rotation angle sensor 42 on the input side and a rotation angle sensor 44 on the output side detect rotational speeds Nin and Nout of the input shaft 12 and the output shaft 14, respectively, and a water temperature sensor 46 detects cooling water temperature of the engine 16. An accelerator pedal 50 is provided at a driver's seat 48, a throttle valve in an intake air path is interlocked with the accelerator pedal 50, and a throttle opening sensor 52 detects a throttle opening $\theta$. A shift position sensor 54 detects a shift range of a shift lever located close to the driver's seat.

Figure 2:
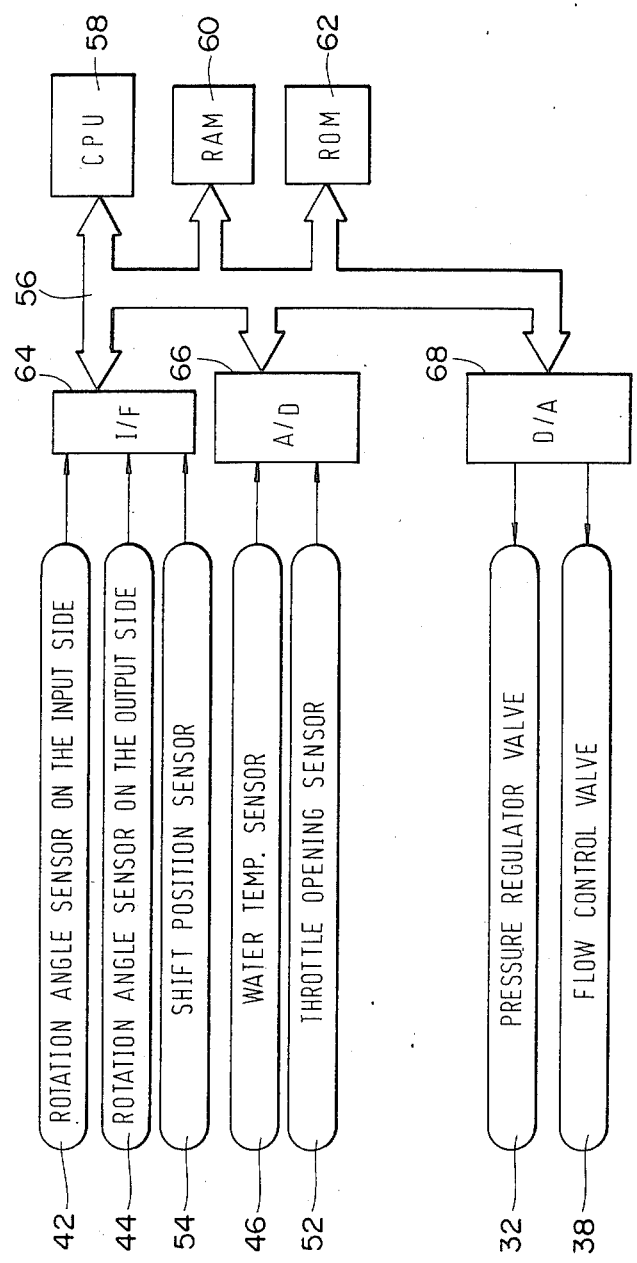
FIG. 2 is a block diagram showing the electronic control device.

FIG. 2 is a block diagram of the electronic control device. An address data bus 56 connects a CPU (Central Processing Unit) 58, an RAM (Random Access Memory) 60, an ROM (Read-Only Memory) 62, an I/F (Interface) 64, an A/D (Analogue/Digital Convertor) 66 and D/A (Digital/Analogue Convertor) 68 to one another. The I/F 64 receives pulse signals from the rotation angle sensor 42 on the input side, the rotation angle sensor 44 on the output side and the shift position sensor 54, the A/D 66 receives analogue signals from the water temperature sensor 46 and the throttle opening sensor 52, and the D/A 68 outputs pulse signals to the pressure regulator valve 32 and the flow control valve 38.

Figure 3:
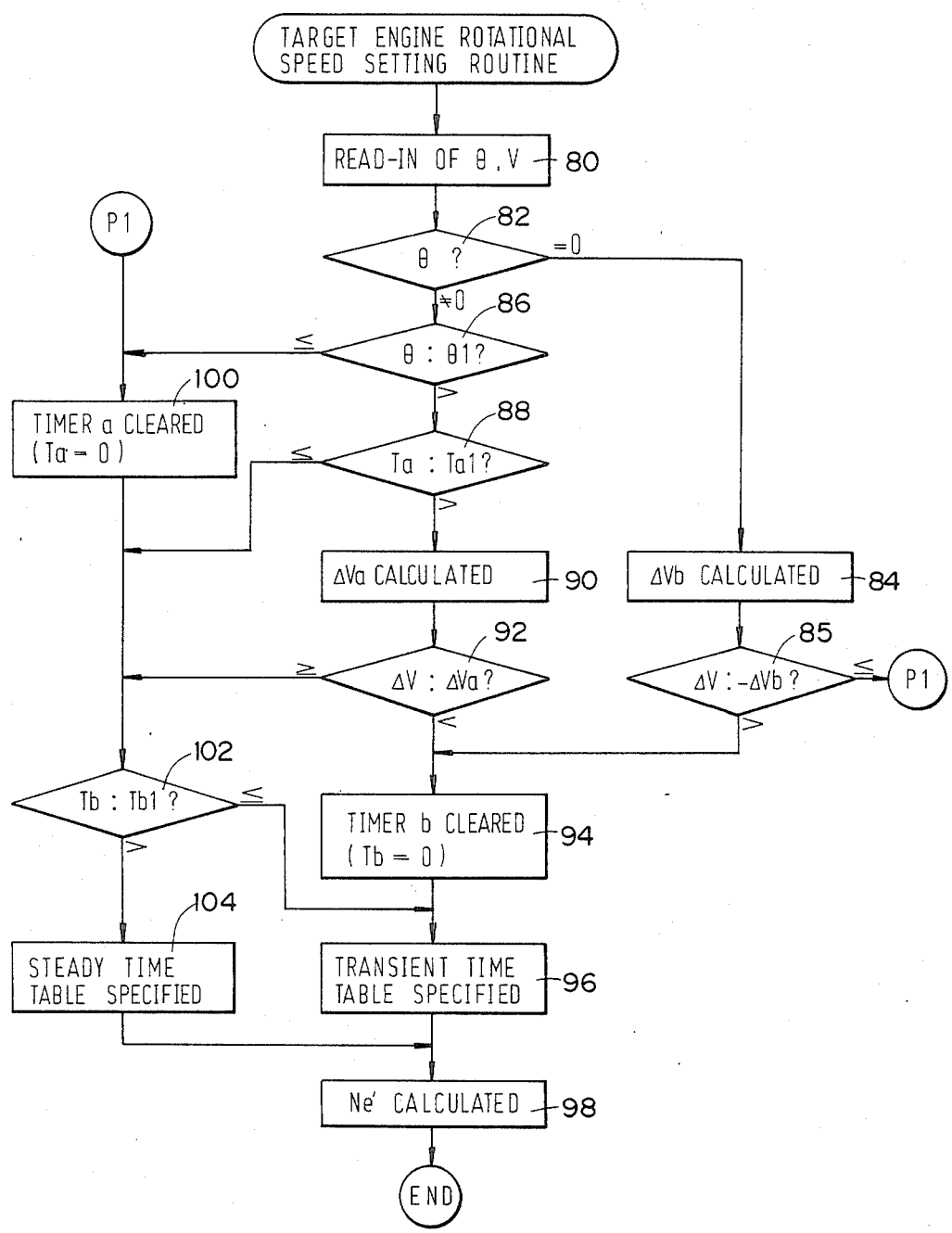
FIG. 3 is a flow chart of a target engine rotational speed setting routine.

FIG. 3 is a flow chart of the target engine rotational speed setting routine. Prior to description of FIG. 3, description will be given of FIGS. 4 to 7 relating to FIG. 3.

Figure 4:
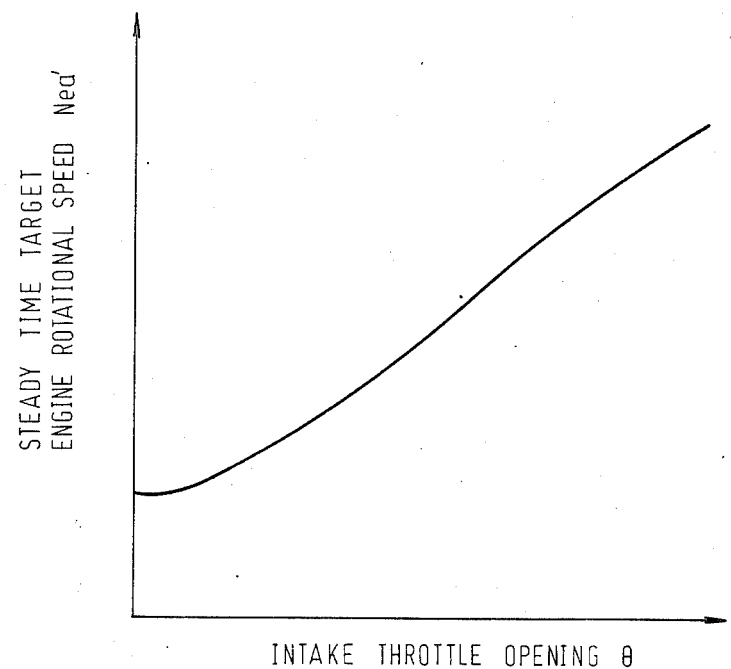
FIG. 4 is a graphic chart showing the characteristics of the steady time target engine rotational speed.

FIG. 4 shows the steady time target engine rotational speed Nea' as a function of the intake throttle opening $\theta$. As the steady time target engine rotational speed Nea', an engine rotational speed is set, at which a required value of an engine output commensurate to the intake throttle opening $\theta$ at the minimum fuel consumption rate.

Figure 5:
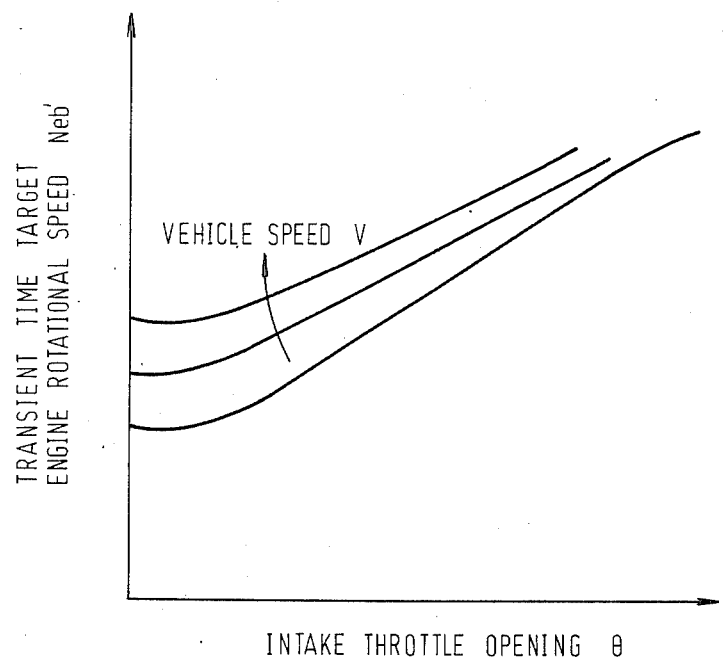
FIG. 5 is a graphic chart showing the characteristics of the transient time target engine rotational speed.

FIG. 5 shows the transient target engine rotational speed Neb' as a function of the intake throttle opening $\theta$ and the vehicle speed V ($\alpha$ Nout). As the transient time target engine rotational speed Neb', an engine rotational speed is set, at which the most proper driving torque and the engine brake occur under various conditions.

Nea' and Neb', which are defined in FIGS. 4 and 5, are stored in the ROM 62 as the steady time table and the transient time table, respectively.

Figure 6:
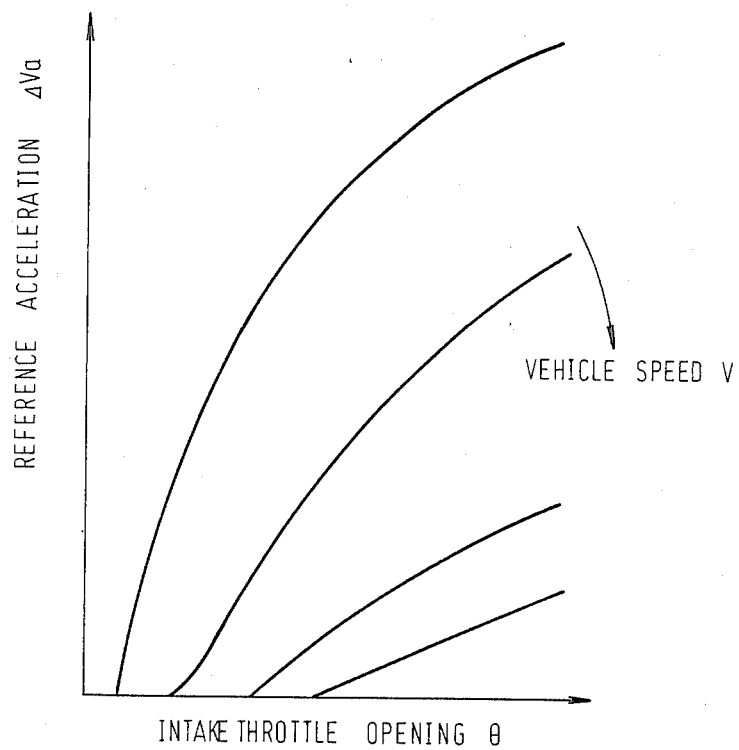
FIG. 6 is a graphic chart showing the characteristics of the reference acceleration.
Figure 7:
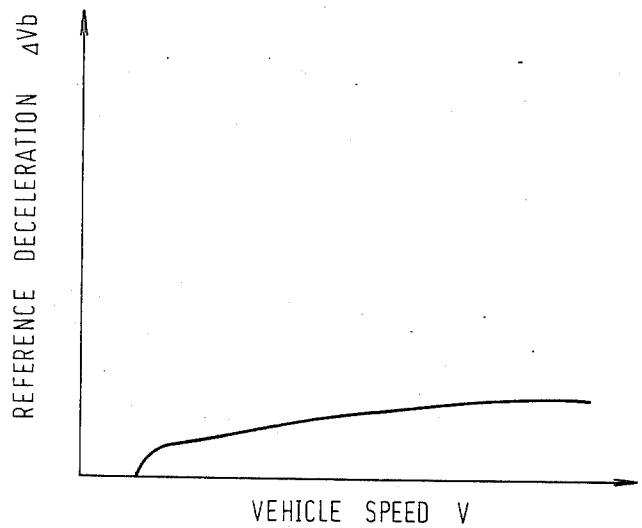
FIG. 7 is a graphic chart showing the characteristics of the reference deceleration.

FIGS. 6 and 7 show the reference acceleration $\Delta Va$ and the reference deceleration $\Delta Vb$, respectively. When an actual acceleration $\Delta V$ is smaller than $\Delta Va$ at the time of acceleration is required, the acceleration is regarded as unsatisfactory, and when $\Delta V$ is larger than $-\Delta Vb$ at the time of deceleration is required, the deceleration is regarded as unsatisfactory.

Detailed description will now be given of the routine shown in FIG. 3. Additionally, a time Ta measured by a timer a indicates an elapsed time from a state of $\theta$ smaller than or equal to $\theta 1$ to a state of $\theta$ larger than $\theta 1$, and a time Tb measured by a timer b indicates an elapsed time from the time where the acceleration requirement is discontinued, or from the time where a satisfactory acceleration or deceleration is generated.

Firstly, the intake throttle opening $\theta$ and the vehicle speed V are read in (Step 80), and judgment is made as to whether $\theta=0$, namely, an idling opening or not (Step 82). When it is the idling opening, it is judged that deceleration is reuired, and the reference deceleration $\Delta Vb$ is determined in accordance with the graphic chart of FIG. 6 (Step 84), whereby the actual acceleration $\Delta V$ and $-\Delta Vb$ are compared with each other (Step 85). Such determination of a value by reference to a chart will hereinafter be referred to as a calculation. When $\theta$ is not the idling opening, $\theta$ is compared with a predetermined value $\theta 1$ ($\theta 1$ is about 25%)(Step 86). When $\theta$ is smaller than or equal to $\theta 1$, the timer a is cleared, namely, Ta is made to be 0 (Step 100), and, when $\theta$ is larger than $\theta 1$, the time Ta from a state of $\theta$ less than or equal to $\theta 1$ to a state of $\theta$ larger than $\theta 1$ is compared with the predetermined time Ta1 (Ta1 is 2-3 sec for example)(Step 88). The predetermined time Ta1 is set in order to avoid a start of a transient time control resulting from such a driver's behavior as to instantaneously depresses an accelerator pedal, not requiring an acceleration in fact. When the state of $\theta$ larger than $\theta 1$ is continued beyond the predetermined time Ta1, the reference acceleration $\Delta Va$ is calculated in accordance with the graphic chart of FIG. 6 (Step 90), and the actual acceleration $\Delta V$ is compared with the reference acceleration $\Delta Va$ (Step 92).

Finally, when $\theta=0$ and $\Delta V$ is larger than $-\Delta Vb$, namely, when a deceleration is unsatisfactory regardless of a deceleration requirement or when the state of $\theta$ larger than $\theta 1$ is continued beyond the predetermined time Ta1 and $\Delta V$ is smaller than $\Delta Va$, namely, when an acceleration is unsatisfactory regardless of an acceleration requirement, the transient time table of FIG. 5 is specified (Step 96).

Furthermore, after the condition of $\theta=0$ and $\Delta V$ is larger than $-\Delta Vb$ disappears, namely, after a satisfactory deceleration is generated at the time of a deceleration requirement, or after the condition of $\theta$ larger than $\theta 1$ and $\Delta V$ larger than or equal to $\Delta Va$ disappears, namely, after the acceleration requirement disappears or after a satisfactory acceleration is generated at the time of an acceleration requirement, still during the predetermined time Tb1 (Tb1 is about 2-3 sec for example)(the judgment of Step 102 is Tb shorter than Tb1), the transient time table is specified. This is because, in the case of driving over a long uphill road or a downhill road, the acceleration requirement or the deceleration requirement often occur again upon completion of the preceding acceleration requirement or deceleration requirement, and further, when the uphill roads and the downhill roads alternate, and, in the above-described cases, the transient time table is continuously specified.

When the transient time table is not specified, the steady time table is specified (Step 104). The target engine rotational speed Ne' is calculated on the basis of the table finally specified. Instead of providing the steady time table and the transient time table, respectively, the steady time target engine rotational speed Nea' may be made to be a basic target engine rotational speed, and the transient time engine rotational speed Neb' may be made to be a product C·Nea' obtained by multiplying the basic target engine rotational speed Nea' and a coefficient C.

Figure 8:
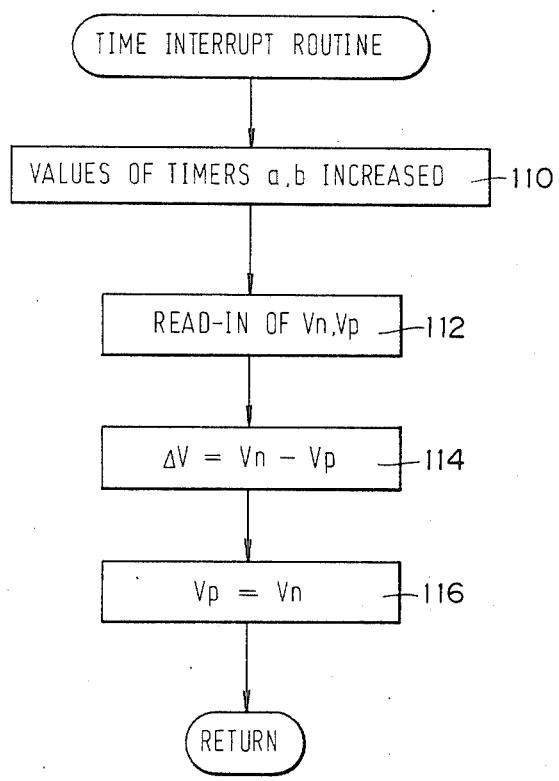
FIG. 8 is a flow chart of a time interrupt routine.

FIG. 8 is a flow chart of the time interrupt routine performed every predetermined time. Values of the timers a and b are each increased by a predetermined value (Step 110), a current vehicle speed Vn and a vehicle speed Vp at the preceding time of performance of the routine are read in (Step 112), Vn−Vp is made to be the acceleration $\Delta V$ (Step 114), and finally, Vn is substituted in Vp (Step 116).

Figure 9:
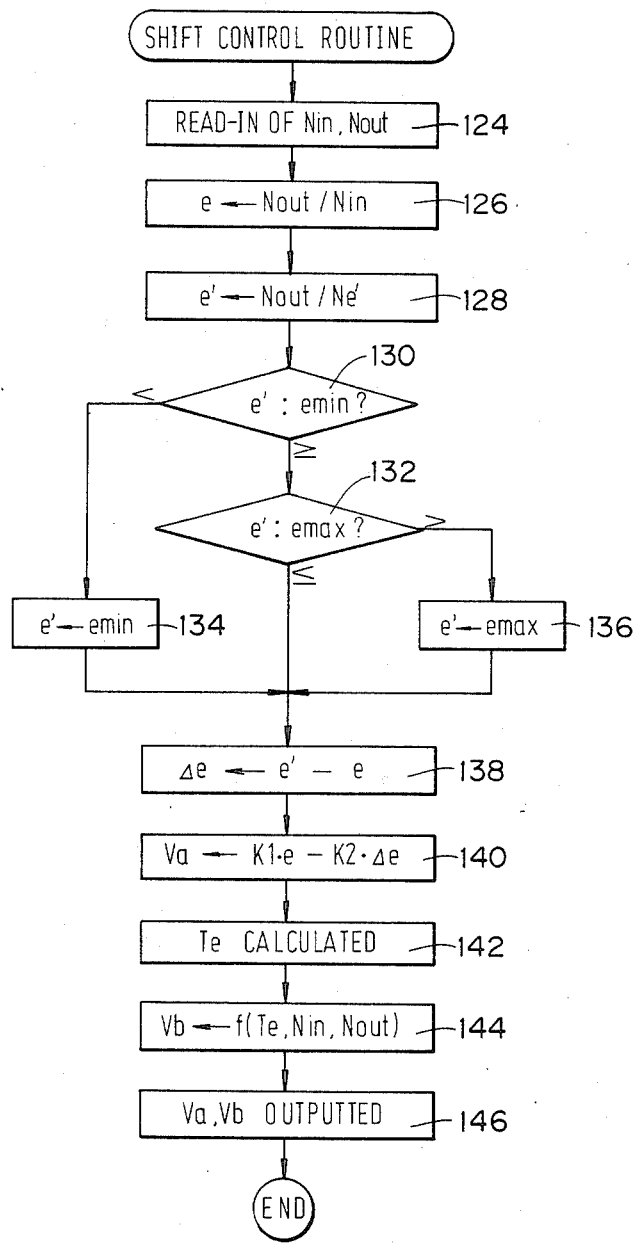
FIG. 9 is a flow chart of a shift control routine.

FIG. 9 is a flow chart of the shift control routine. The flow control valve 38 is controlled such that the actual engine rotational speed Ne (=Nin) can be the target engine rotational speed Ne', and the pressure regulator valve 32 is controlled such that the line pressure Pl can be the minimum value at which the slips of the belt 26 can be avoided.

Detailed description will now be given of this routine. The rotational speeds Nin and Nout on the input and output sides of the CVT 10 are read in (Step 124), Nout/Nin is substituted into the speed ratio e (Step 126) and Nout/Ne' is substituted into a target speed ratio e' (Step 128). Subsequently, the upper and lower limits of the target speed ratio e' are determined to emax and emin, respectively (Steps 130, 132, 134 and 136), e' - e is substituted into a deviation $\Delta e$ (Step 138), and K1·e - K2·$\Delta e$ is substituted into the control voltage Va of the flow control valve 38 (Step 140), where K1 and K2 are predetermined values. The oil feed value to the hydraulic cylinder on the input side is decreased by a value commensurate to the deviation Δe, whereby e approaches e'. Further, an output torque Te of the engine is calculated on the basis of the intake throttle opening θ or the like (Step 142), and the control voltage vb of the pressure regulator valve 32 is calculated as a function f of Te, Nin and Nout (Step 144). The function f is associated with torques on the pulleys 24a and 24b on the output side. Va and Vb which have been calculated as described above are outputted to the flow control valve 38 and the pressure regulator valve 32, respectively (Step 146).

The present invention has been described in conjunction with the examples shown in the drawings, however, it should be apparent to those skilled in the art to correct and modify the present invention in various ways within a scope of not departing from the spirit of the present invention as described in claims.

What is claimed is:

1. A control device in a continuously variable transmission system for a vehicle, wherein said continuously variable transmission system is provided on a power transmission route of an engine and a speed ratio thereof is controlled such that an engine rotational speed can be a target engine rotational speed, comprising:
    throttle opening sensor means;
    rotation angle sensor means; and
    processor means including:
    (a) an acceleration requirement detecting means for detecting a requirement for an acceleration of the vehicle;
    (b) a deceleration requirement detecting means for detecting a requirement for a deceleration of the vehicle;
    (c) an acceleration detecting means for detecting an acceleration of the vehicle;
    (d) a deceleration detecting means for detecting a deceleration of the vehicle;
    (e) a first comparing means for comparing a detected acceleration with a reference acceleration;
    (f) a second comparing means for comparing a detected deceleration with a reference deceleration;
    (g) a selecting means for selecting a steady time target engine rotational speed or a transient time target engine rotational speed as a target engine rotational speed; and
    (h) a control means for selecting a transient time target engine rotational speed when a detected acceleration during acceleration is smaller in value than the reference acceleration or a detected deceleration during deceleration is smaller in value than the reference deceleration.

2. A control device as set forth in claim 1, wherein said acceleration requirement detecting means judges that an acceleration of the vehicle is required when a condition is satisfied that an intake throttle opening θ is larger than a predetermined value θ1, for longer than a predetermined time Ta1.

3. A control device as set forth in claim 2, wherein said control means satisfies the condition that when the transient time target engine rotational speed is selected, said selecting means is caused to select the transient time target engine rotational speed during a predetermined time Tb1 after θ is changed to a state of θ smaller than or equal to θ1.

4. A control device as set forth in claim 1, wherein said control means satisfies the condition that when the transient time target engine rotational speed is selected, said selecting means is caused to select the transient time target engine rotational speed during a predetermined time Tb1 after the detected acceleration exceeds the reference acceleration.

5. A control device as set forth in claim 1, wherein said deceleration requirement detecting means judges that a deceleration is required when an intake throttle opening ? is at an idling opening.

6. A control device as set forth in claim 1, wherein said control means satisfies the condition that when the transient time target engine rotational speed is selected, said selecting means is caused to select the transient time target engine rotational speed during a predetermined time Tb1 after the detected deceleration exceeds the reference deceleration.

7. A control device as set forth in claim 1, wherein said transient time target engine rotational speed is a function of an intake throttle opening θ and a vehicle speed V.

8. A control device as set forth in claim 1, wherein said reference acceleration is a function of an intake throttle opening θ and a vehicle speed V.

9. A control device as set forth in claim 1, wherein said reference deceleration is a function of a vehicle speed V.

10. A control device as set forth in claim 1, wherein said steady time target engine rotational speed, comprising an engine rotational speed at which a required value of an engine output commensurate to an intake throttle opening θ at the minimum fuel consumption rate is obtained.

11. A control device as set forth in claim 1, wherein said transient time target engine rotational speed, comprises an engine rotational speed at which the most proper driving torque and engine brake under various conditions are obtained.

12. A control device as set forth in claim 1, including a steady time table and a transient time table, which are commensurate to said steady time target engine rotational speed and said transient time target engine rotational speed, respectively, and wherein said selecting means selects either one of said tables.

13. A control device as set forth in claim 1, wherein said steady time target engine rotational speed comprises a basic target engine rotational speed multiplied by a coefficient thereof selected by said selecting means.

14. A control method of a continuously variable transmission system for a vehicle, wherein said continuously variable transmission system is provided on a power transmission route of an engine and a speed ratio thereof is controlled such that an engine rotational speed can be a target engine rotational speed, comprising the steps of:
    detecting an acceleration of the vehicle;
    judging whether or not the detected acceleration during acceleration is smaller in value than a reference acceleration;
    detecting a deceleration of the vehicle;
    judging whether or not the detected deceleration during deceleration is smaller in value than a reference deceleration;
    selecting a transient time target engine rotational speed when the detected acceleration during acceleration is smaller in value than the reference acceleration or the detected deceleration during deceleration is smaller in value than the reference deceleration; and
    selecting a steady time target engine rotational speed when the detected acceleration during acceleration is not smaller in value than the reference acceleration and the detected deceleration during deceleration is not smaller in value than the reference deceleration.

* * * * *